(12) United States Patent
 Jonckers et al.

(10) Patent No.: US 10,836,635 B2
(45) Date of Patent: Nov. 17, 2020

(54) METHOD FOR TREATING OFF GAS AND PRODUCING HYDROGEN

(71) Applicants: SHELL OIL COMPANY, Houston, TX (US); SHELL INTERNATIONALE RESEARCH MAATSCHAPPIJ B.V., The Hague (NL)

(72) Inventors: Arjan Allert Jonckers, Amsterdam (NL); Julie Hélène Emond Duncan, Amsterdam (NL); Sanjay Madhoprasad Rungta, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 422 days.

(21) Appl. No.: 15/555,770

(22) PCT Filed: Mar. 1, 2016

(86) PCT No.: PCT/EP2016/054287
§ 371 (c)(1),
(2) Date: Sep. 5, 2017

(87) PCT Pub. No.: WO2016/139191
PCT Pub. Date: Sep. 9, 2016

(65) Prior Publication Data
US 2018/0044178 A1    Feb. 15, 2018

(30) Foreign Application Priority Data

Mar. 3, 2015 (EP) .................................. 15157423

(51) Int. Cl.
*C01B 3/48* (2006.01)
*B01D 53/047* (2006.01)
(Continued)

(52) U.S. Cl.
CPC ............... *C01B 3/48* (2013.01); *B01D 53/047* (2013.01); *B01J 8/0278* (2013.01); *B01J 19/245* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS

2004/0077736 A1    4/2004  Steynberg et al.
2008/0300326 A1    12/2008 Schneider et al.
(Continued)

OTHER PUBLICATIONS

International Search Report and Written Opinion received for PCT Patent Application No. PCT/EP2016/054287, dated May 19, 2016, 10 pages.
(Continued)

*Primary Examiner* — Amber R Orlando
*Assistant Examiner* — Syed T Iqbal

(57) ABSTRACT

The present invention relates to a method for obtaining a hydrogen rich gas from an off gas. Further, the invention relates to a system for operating said method.

8 Claims, 3 Drawing Sheets

Figure 1:
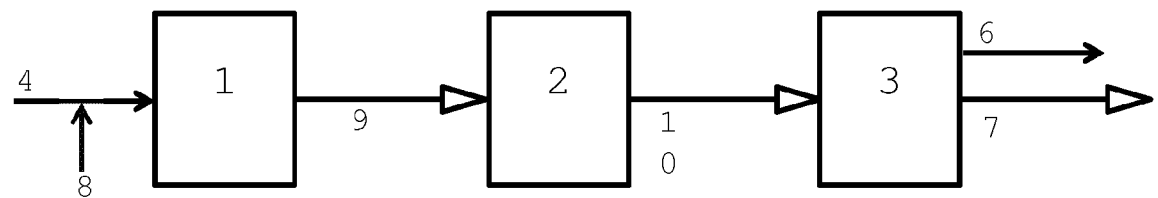

(51) Int. Cl.
*B01J 8/02* (2006.01)
*B01J 19/24* (2006.01)
*C01B 3/56* (2006.01)

(52) U.S. Cl.
CPC .......... *C01B 3/56* (2013.01); *B01D 2253/102* (2013.01); *B01D 2253/104* (2013.01); *B01D 2253/106* (2013.01); *B01D 2253/108* (2013.01); *B01D 2253/116* (2013.01); *B01D 2256/16* (2013.01); *B01D 2257/102* (2013.01); *B01D 2257/11* (2013.01); *B01D 2257/502* (2013.01); *B01D 2257/504* (2013.01); *B01D 2259/4003* (2013.01); *C01B 2203/0233* (2013.01); *C01B 2203/0283* (2013.01); *C01B 2203/042* (2013.01); *C01B 2203/043* (2013.01); *C01B 2203/0475* (2013.01); *C01B 2203/1241* (2013.01); *Y02C 10/08* (2013.01); *Y02P 20/152* (2015.11)

(58) Field of Classification Search
CPC .......... B01D 2253/116; B01D 2256/16; B01D 2257/102; B01D 2257/11; B01D 2257/502; B01D 2257/504; B01D 2259/4003; B01D 53/047; B01J 19/245; B01J 8/0278; C01B 2203/0233; C01B 2203/0283; C01B 2203/042; C01B 2203/043; C01B 2203/0475; C01B 2203/1241; C01B 3/48; C01B 3/56; Y02C 10/08; Y02P 20/152

See application file for complete search history.

(56) References Cited

U.S. PATENT DOCUMENTS

| | | |
|---|---|---|
| 2010/0288123 A1 | 11/2010 | Chen et al. |
| 2011/0011128 A1 | 1/2011 | Grover |
| 2014/0010753 A1* | 1/2014 | Sundaram .................. C01B 3/32 423/652 |
| 2014/0105814 A1 | 4/2014 | Iaquaniello et al. |

OTHER PUBLICATIONS

The Linde Group, "CO shift conversion," [online] https://www.linde-engineering.com/en/process-plants/hydrogen_and_synthesis_gas_plants/gas_generation/co_shift_conversion/index.html.

\* cited by examiner

METHOD FOR TREATING OFF GAS AND PRODUCING HYDROGEN

PRIORITY CLAIM

The present application is the National Stage (§ 371) of International Application No. PCT/US2016/054287, filed Mar. 1, 2016, which claims priority from European Patent Application No. 15157423.3, filed Mar. 3, 2015 incorporated herein by reference.

FIELD OF THE INVENTION

The present invention relates to a method for treating an off gas obtained from a chemical reaction. The present invention relates to a system for treating said off gas.

BACKGROUND TO THE INVENTION

Synthesis reactions of hydrocarbons from synthesis gas such as the Fischer-Tropsch process can be used for the conversion of hydrocarbonaceous feed stocks into normally liquid and/or solid hydrocarbons (i.e. measured at 0° C., 1 bar). The feed stock (e.g. natural gas, associated gas, coalbed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight molecules comprising up to 200 carbon atoms, or, under particular circumstances, even more. The hydrocarbon products manufactured in the Fischer-Tropsch process are processed into different fractions, for example a liquid hydrocarbon stream comprising mainly C5+ hydrocarbons, and a gaseous hydrocarbon stream which comprises methane, carbon dioxide, unconverted carbon monoxide, unconverted hydrogen, olefins and lower hydrocarbons. The gaseous hydrocarbon stream may also comprise nitrogen and/or argon as the syngas sent to the Fischer-Tropsch reactor may contain some nitrogen and/or argon.

The gaseous hydrocarbon stream is often referred to as Fischer-Tropsch off-gas or Fischer Tropsch tail gas. Fischer-Tropsch off-gas can be recycled to the syngas manufacturing or to the Fischer-Tropsch reactor. Sometimes lower hydrocarbons are removed before the off-gas is recycled. Lower hydrocarbons may be removed by decreasing the temperature of the off-gas and then applying a gas-liquid separation.

However, when the off-gas is recycled to the syngas manufacturing or to the Fischer-Tropsch reactor, the components in the off-gas which do not take part in the reactions, such as nitrogen and argon, occupy reactor space. The components which do not take part in the Fischer-Tropsch reaction are also referred to as "inerts".

The level of inerts in the Fischer-Tropsch reactor increases with increasing Fischer-Tropsch off-gas recycling. It is common to recycle only a relatively small part of the off-gas. One possibility is to recycle a part of the Fischer-Tropsch off-gas to one or more Fischer-Tropsch reactors and/or to the synthesis gas manufacturing unit, while another part of the off-gas is used as fuel. A downside of this is that only a part of the carbon atoms of the hydrocarbonaceous feed stock is converted to the desired C5+ hydrocarbons. The pace of the build-up of inerts can be reduced by treating the off-gas before it is recycled.

US20110011128 describes a PSA comprising system in which purified hydrogen is produced using a PSA, which may be a conventional co-purge H2 PSA unit. Such a system may be useful to a hydrogen-rich gas mixture exiting a steam methane reformer, but is not suitable to treat nitrogen comprising hydrogen-lean off-gas of a Fischer-Tropsch process.

US20040077736 mentions a process in which a liquid phase and a vapour phase are withdrawn from a hydrocarbons synthesis stage. In a vapour phase work-up stage, hydrocarbon products having 3 or more carbon atoms may be removed and the residual vapour phase may then pass to a PSA. Using the PSA first, second and optionally third gas components are separated. The first gas component comprises carbon monoxide and hydrogen. The second gas component comprises methane, and the optional third gas component comprises carbon dioxide. The first gas component is recycled to the hydrocarbon synthesis stage. US20040077736 does not provide details on the PSA method used. A regular use of a normal PSA would result in a relatively low recovery of carbon monoxide in the first gas component, and a build-up of nitrogen in the reactor upon recycling the first gas component to the hydrocarbon synthesis stage.

US20080300326-A1 describes the use of a PSA method to separate Fischer-Tropsch off-gas. The method produces at least one gas stream comprising hydrogen, at least one gas stream mainly comprising methane, and at least one gas stream comprising carbon dioxide, nitrogen and/or argon, and hydrocarbons with at least 2 carbon atoms. The PSA used comprises at least three adsorbent beds: alumina, carbon molecular sieves or silicates, activated carbon, and optionally zeolite. The alumina is used to remove water. The carbon molecular sieves or silicates are used to adsorb carbon dioxide and partially methane. The activated carbon is used to adsorb methane and partially nitrogen and carbon monoxide. Zeolite may be used to adsorb nitrogen, argon and carbon monoxide. The product stream of the PSA mainly comprises hydrogen. The other gas streams are obtained during the decompression phase. Disadvantages of the method of US20080300326-A1 are at least the following. Nitrogen is only partially adsorbed in the PSA. This results in a build-up of nitrogen in the Fischer-Tropsch reactor when the hydrogen stream is used, i.e. recycled, as reactant gas. Also the methane stream comprises nitrogen and thus results in the build-up of nitrogen in the syngas, and thus in the Fischer-Tropsch reactor, when the methane stream is used for generating syngas. Another disadvantage of the method of US20080300326-A1 is that carbon monoxide is only recycled to the Fischer-Tropsch reactor in a limited amount. Carbon monoxide is present in the hydrogen stream and in the methane stream.

Hydrogen is utilized abundantly in chemical plants such as GTL plants. Hence there is continued desire in the field to produce hydrogen as efficiently as possible. Since hydrogen is one of the most valued components there is also a continued desire in the field to use hydrogen as efficiently as possible and any waste of hydrogen is unwanted.

SUMMARY OF THE INVENTION

It is an object of the present invention to provide for a method to treat off gas.

Further, it is an object of the present invention to increase the efficiency of the use of hydrogen in a chemical plant.

One or more of the above objects is achieved by a method according to the present invention. The present invention relates to a method for treating an off gas, said off gas being a tail gas of a Fischer-Tropsch reaction, said method comprising the following steps:

(1) feeding said off gas and an appropriate amount of steam to a reforming unit comprising a steam methane reforming reactor, obtaining a first effluent;

(2) feeding said first effluent and optionally an appropriate amount of steam through a high, medium or low temperature shift reactor(s) or a combination thereof to convert at least part of the carbon monoxide and water into hydrogen and carbon dioxide, to obtain a second effluent;

(3) optionally, removing bulk water from the second effluent obtained in steps (1) or (2);

(4) feeding the second effluent of step (2)and/or (3) through a pressure swing adsorption (PSA) unit operated such that a hydrogen rich gas stream is obtained;

wherein natural gas is added to the off gas and/or the first effluent obtained in step (1).

DETAILED DESCRIPTION OF THE INVENTION

As described above the present invention relates to a method for treating an off gas. The method according to the present invention comprises the steps (1)-(4) as described above.

Off gas from a Fischer-Tropsch reactor often contains residual methane. Said methane can be formed during a Fischer-Tropsch reaction but can also originate from the syngas provided to the Fischer-Tropsch reactor. Methane present in the syngas originates from unconverted methane during syngas manufacturing from for example natural gas, coal or biomass.

In step (1) off gas is mixed with steam and fed through a steam methane reforming (SMR) reactor. At the exit of the SMR reactor a first effluent exits. The reactor is operated such that mainly hydrogen and carbon monoxide is formed from methane. Further, the shift reactor of step 2 is operated such that the carbon monoxide present in the gas stream obtained in step 1 (first effluent), is converted together with water into carbon dioxide and hydrogen. The gas stream exiting the shift reactor (second effluent) can still contain water. In case water is present in large amounts this water can be removed prior to feeding the second effluent to the PSA unit.

In a preferred embodiment the inlet temperatures of the SMR reactor are between 830 and 1000° C., preferably between 830 and 930° C. In these ranges good conversion results are obtained.

Preferably, the SMR is operated at a pressure ranging from 15 barg to 50 barg. At these pressures good conversion results are obtained.

In an embodiment of the present invention the PSA unit is operated as follows:

(A) feeding the second effluent obtained in step (2)and/or (3) through one or more columns in the PSA unit, said one or more columns comprising an adsorbent bed, wherein the adsorbent bed comprises alumina, a carbon molecular sieve, silicalite, activated carbon, a zeolite, or mixtures thereof, with upon commencement of said feeding, the bed and column being pre-saturated and pre-pressurized to a pressure in the range of 20 to 80 bar absolute (bar a), preferably 30 to 70 bar a, with a gas preferably comprising or consisting of the second effluent of step (2) and/or (3) or comprising 80 to 99.9 volume % hydrogen, and discharging a third effluent from the other end of said bed, and continuing said feeding and said discharging until a nitrogen and/or argon comprising gas has reached at least 45% of the length of the bed and has reached at most 80% of the length of the bed, calculated from the end of the bed at which the second effluent is being fed;

(B) ceasing the feeding of the second effluent, and reducing the pressure in the column and the bed by about 2 to 25 bar a; and (C) further reducing the pressure of the column and adsorbent bed to a pressure in the range of 1 to 5 bar a; and (D) rinsing the column and adsorbent bed by feeding a gas, preferably comprising 80 to 99.9 volume % hydrogen, through the column and adsorbent bed:

the column and bed being at a pressure in the range of 1 to 5 bar a; and (E) pressurizing the column and adsorbent bed to a pressure in the range of 15 to 75 bar a, preferably 25 to 65 bar a, more preferably 30 to 55 bar a by feeding a gas, preferably comprising or consisting of the second effluent of step (2) and/or (3) or comprising 80 to 99.9 volume % hydrogen.

The inventors have found that by operating the PSA unit according to steps (A) to (E) a hydrogen rich gas stream can be obtained. Preferably the hydrogen content is at least 95 volume %.

In an embodiment of the present invention natural gas is added to the off gas and/or the first effluent obtained in step (1). Preferably, said natural gas has been desulfurized. Preferably, the natural gas provided upstream of the reforming unit is mixed with steam prior to being added to the off gas stream.

By adding natural gas to the off gas stream more hydrogen can be obtained with the method according to the present invention. By regulating the amount of natural gas to be added to the off gas stream the content of the first effluent and second effluent can be controlled. This way an optimum amount of ingredients to be converted can be maintained. This results in a more efficient way of obtaining hydrogen from the off gas produced by the Fischer-Tropsch reaction.

The off gas used in the present invention preferably comprises (in volume percentage based on the total volume of the off gas):

| | |
|---|---|
| Methane | 1-50 vol %; |
| Carbon Monoxide | 10-45 vol %; |
| Carbon Dioxide | 10-65 vol %; |
| Hydrogen | 5-80 vol %; |
| Nitrogen | 0.5-55 vol %; |
| Argon | 0-55 vol %. |

The inventors have found that with the method according to the present invention hydrogen can efficiently be obtained from an off gas having these ingredients.

In an embodiment of the present invention the gas fed to the high, medium or low temperature shift reactor(s) or a combination thereof comprises (in volume percentage based on the total volume of the gas fed):

| | |
|---|---|
| Methane | 1-50 vol %; |
| Carbon Monoxide | 5-45 vol %; |
| Carbon Dioxide | 5-65 vol %; |
| Hydrogen | 5-80 vol %; |
| Nitrogen | 0.001-55 vol %; |
| Argon | 0-55 vol %. |

In case necessary, natural gas and/or additional untreated off gas can be added to the gas fed to the high, medium or low temperature shift reactor(s). The addition of one or both of these gasses can be useful in case the content of ingredients of the first effluent differs from the contents described for the gas to be fed to the shift reactor(s). One or both of the gasses can also be added in order to obtain a second effluent with the desired hydrogen content.

In an embodiment of the present invention the second effluent comprises (in volume percentage based on the total volume of the second effluent):

| | |
|---|---|
| Methane | 1-20 vol %; |
| Carbon Monoxide | 1-10 vol %; |
| Carbon Dioxide | 10-40 vol %; |
| Hydrogen | 40-95 vol %; |
| Nitrogen | 0.001-10 vol %; |
| Argon | 0.0001-5 vol %. |

The method according to the present invention can be performed with a system as described below and has one or more of the advantages as described previously. The system is for treating off gas and comprises the following items, connected in series:

one or more reforming units, each unit comprising at least a steam methane reforming reactor;

one or more high, medium or low temperature shift reactor(s) or a combination thereof to convert at least part of the carbon monoxide and steam into hydrogen and carbon dioxide; and one or more pressure swing adsorption units.

In an embodiment of the present invention said system comprises at least two reforming units in parallel.

In an embodiment the pressure swing adsorption unit comprises:

one or more columns, comprising an adsorbent bed, wherein the adsorbent bed comprises alumina, a carbon molecular sieve, silicalite, activated carbon, a zeolite, or mixtures thereof.

In an embodiment the system comprises upstream of the one or more steam methane reforming reactors an inlet for adding natural gas to the off gas.

In an embodiment the system comprises upstream of the one or more high, medium or low temperature shift reactor(s) or a combination thereof, an inlet for adding off gas to the first effluent wherein the off gas originates from a hydrocarbon synthesis reactor such as a Fischer-Tropsch reactor.

In an embodiment the system comprises comprises:

a further PSA unit comprising one or more columns provided down-stream of the first PSA unit, said one or more columns comprising an adsorbent bed, the adsorbent bed comprising alumina, a carbon molecular sieve, silicalite, activated carbon, a zeolite, or mixtures thereof.

Preferably the system comprises one or more inlets for the provision of natural gas to the off gas stream upstream of the reforming unit and/or to the first effluent. As mentioned previously, the provision of natural gas upstream or downstream of the reforming unit allows for the control of the content of the gas streams downstream of the reforming unit and/or the temperature shift reactor(s). This allows for a very efficient way of treating off gas such that hydrogen can be obtained from off gas.

In an embodiment reforming unit further comprises a pre-reforming reactor. In case the reforming unit comprises a pre reformer, the pre reformer reactor is positioned upstream of the methane reformer reactor in the reformer unit. The pre reformer allows for the reformer to be operated at a lower temperature compared to a methane reformer unit without an upstream pre reformer, whilst still obtaining good results with respect the conversion of methane to hydrogen and carbon monoxide.

The invention will be further illustrated by the figures. The figures represent preferred embodiments of the invention and are not intended to limit the present invention.

FIG. 1 schematically depicts a system according to the present invention.

Figure 2:
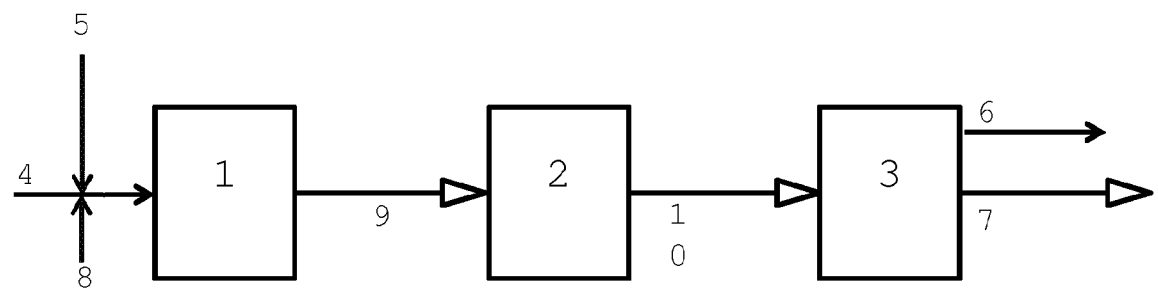

FIG. 2 schematically depicts a system according to the present invention.

Figure 3:
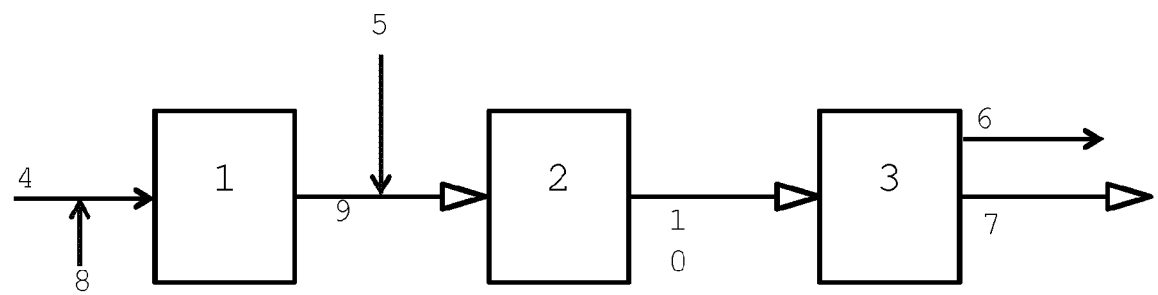
Figure 4:
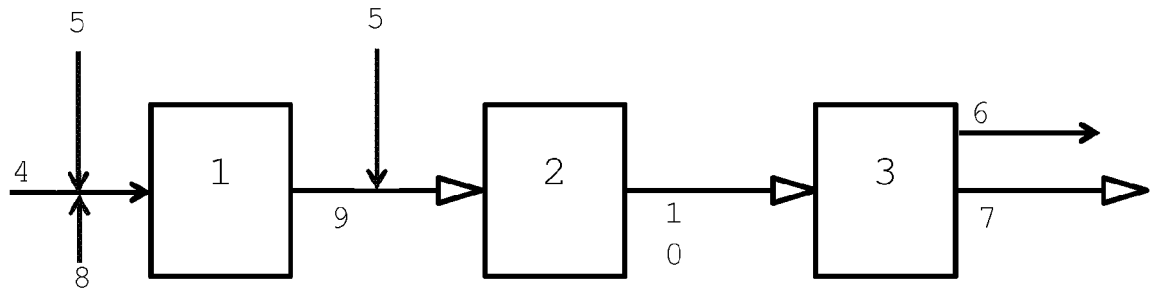

FIG. 3 schematically depicts a system according to the present invention.

FIGS. 4, 5, 6, and 7 schematically also depict a system according to the present invention.

In the figures systems according to the present invention are depicted. In these figures item 1 represents an SMR reactor, item 2 CO shift reactor (low, medium or high temperature) and 3 a PSA unit. Item 4 indicates the off gas stream and 6 the enriched hydrogen gas stream. Item 7 indicates the gas stream comprising the remainder of the constituents (waste stream of the PSA unit). Item 8 depicts the steam stream, item 9 the first effluent and item 10 the second effluent.

FIG. 1 schematically depicts a system in which off gas (4) is provided to the SMR reactor (1). Besides steam (8) no further gas streams are added. Hence the first effluent (9) is obtained from the off gas and steam mixture only.

Figure 5:
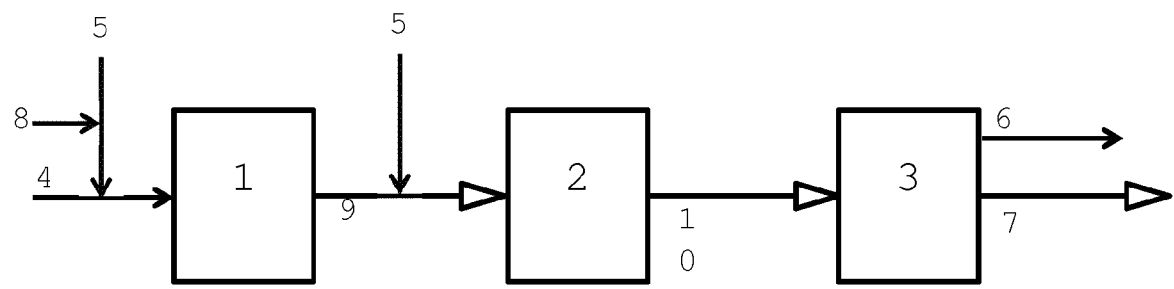
Figure 6:
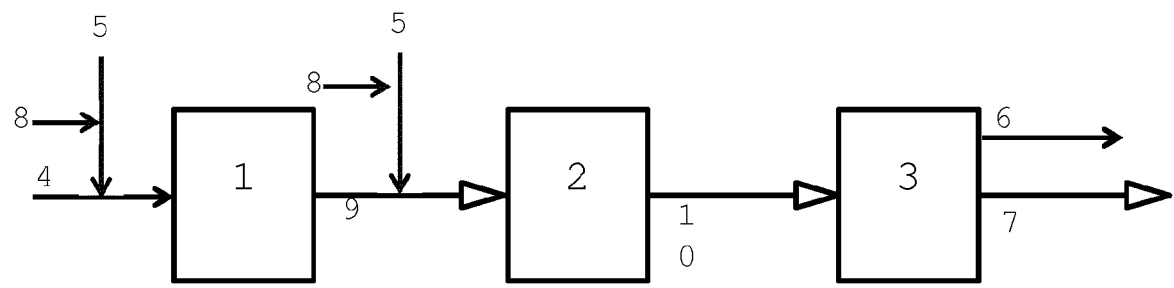

In FIG. 2, natural gas (5) is added to the off gas upstream of the SMR reactor. In FIG. 3, natural gas (5) is added to the first effluent downstream of the SMR reactor. In FIG. 5 natural gas (5) is added both upstream the SMR reactor to the off gas stream (4) and downstream of the SMR reactor to the first effluent (9). The system of FIG. 5 is similar to that of FIG. 4 with the exception that in FIG. 5 steam is added to the natural gas stream (5) instead of to the off gas stream (4). In addition in FIG. 6 steam is added to the off gas stream downstream of the SMR reactor. The system of FIG. 6 is similar to that of FIG. 5 with the exception that steam is also added to the natural gas stream downstream of the SMR reactor.

Figure 7:
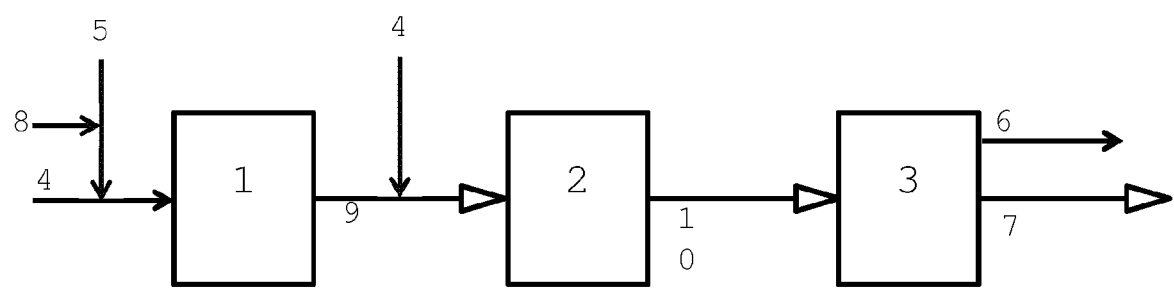

In the system according to FIG. 7 off gas (4) is added to the first effluent (9) downstream of the SMR reactor (1).

Besides the systems depicted in the figures other options of adding steam are possible, such as adding steam directly to and separately from the off gas, to the first effluent exiting the SMR reactor.

The appended claims form an integral part of this description.

What is claimed is:

1. A method for treating an off gas, said off gas being a tail gas of a Fischer-Tropsch reaction,
   said method comprising the following steps:
   (1) feeding said off gas and an amount of steam needed to convert methane into mainly hydrogen and carbon monoxide to a reforming unit comprising a steam methane reforming reactor, obtaining a first effluent comprising carbon monoxide;
   (2) feeding said first effluent through one or more of a high temperature shift reactor, a medium temperature shift reactor, and a low temperature shift reactor to convert at least part of the carbon monoxide and an amount of water into hydrogen and carbon dioxide, to obtain a second effluent;

(3) optionally, removing bulk water from the second effluent obtained in one or more of step (1) and step (2); and (4) feeding the second effluent of one or more of step (2) and step (3) through a pressure swing adsorption (PSA) unit comprising one or more columns, operated such that a hydrogen rich gas stream is obtained;

wherein natural gas is added to one or more of the off gas and the first effluent obtained in step (1).

2. The method according to claim 1 wherein step 4 comprises the following steps:

(A) feeding the second effluent obtained in one or more of step (2) and step (3) through one or more columns in the PSA unit, said one or more columns comprising an adsorbent bed, wherein the adsorbent bed comprises alumina, a carbon molecular sieve, silicalite, activated carbon, a zeolite, and mixtures thereof, with upon commencement of said feeding, the bed and column being pre-saturated and pre-pressurized to a pressure in the range of 20 to 80 bar absolute (bar a), comprising 80 to 99.9 volume% hydrogen, and discharging a third effluent from the other end of said bed, and continuing said feeding and said discharging until one or more of a nitrogen and an argon comprising gas has reached at least 45% of the length of the bed and has reached at most 80% of the length of the bed, calculated from the end of the bed at which the second effluent is being fed;

(B) ceasing the feeding of the second effluent, and reducing the pressure in the column and the bed by about 2 to 25 bar a; and (C) further reducing the pressure of the column and adsorbent bed to a pressure in the range of 1 to 5 bar a; and (D) rinsing the column and adsorbent bed by feeding a gas, through the column and adsorbent bed:

the column and bed being at a pressure in the range of 1 to 5 bar a; and (E) pressurizing the column and adsorbent bed to a pressure in the range of 15 to 75 bar a.

3. The method according to claim 1 wherein a natural gas stream is fed through the steam methane reforming reactor in step (1).

4. The method according to claim 1 wherein the off gas comprises, (in volume percentage based on the total volume of the off gas:

| | |
|---|---|
| Methane | 1-50 vol %; |
| Carbon Monoxide | 10-45 vol %; |
| Carbon Dioxide | 10-65 vol %; |
| Hydrogen | 5-80 vol %; |
| Nitrogen | 0.5-55 vol %; |
| Argon | 0-55 vol %. |

5. The method according to claim 1 wherein the first effluent fed to one or more of the high temperature shift reactor, the medium temperature shift reactor, and the low temperature shift reactor comprises, (in volume percentage based on the total volume of the gas fed:

| | |
|---|---|
| Methane | 1-50 vol %; |
| Carbon Monoxide | 5-45 vol %; |
| Carbon Dioxide | 5-65 vol %; |
| Hydrogen | 5-80 vol %; |
| Nitrogen | 0.001-55 vol %; |
| Argon | 0-55 vol %. |

6. The method according to claim 1 wherein the second effluent comprises, (in volume percentage based on the total volume of the second effluent:

| | |
|---|---|
| Methane | 1-20 vol %; |
| Carbon Monoxide | 1-10 vol %; |
| Carbon Dioxide | 10-40 vol %; |
| Hydrogen | 40-95 vol %; |
| Nitrogen | 0.001-10 vol %; |
| Argon | 0.0001-5 vol %. |

7. The method according to claim 2 wherein the natural gas provided upstream of the reforming unit is mixed with steam prior to being added to the off gas stream.

8. The method according to claims 1 wherein the reforming unit further comprises a pre-reforming reactor.

* * * * *